(12) United States Patent
Jenkins et al.

(10) Patent No.: US 11,335,086 B2
(45) Date of Patent: May 17, 2022

(54) METHODS AND ELECTRONIC DEVICES FOR AUTOMATED WASTE MANAGEMENT

(71) Applicant: Fidelity Ag, Inc., Plano, TX (US)

(72) Inventors: Roy William Jenkins, Dallas, TX (US); Maithreya Chakravarthula, Richardson, TX (US); Wolfgang Decker, Frisco, TX (US); Cristopher Luce, The Colony, TX (US); Christoper Heney, Plano, TX (US); Clifton Luce, Plano, TX (US)

( * ) Notice: Subject to any disclaimer, the term of this patent is extended or adjusted under 35 U.S.C. 154(b) by 0 days.

(21) Appl. No.: 16/826,213

(22) Filed: Mar. 21, 2020

(65) Prior Publication Data

US 2021/0295039 A1    Sep. 23, 2021

(51) Int. Cl.
*G06V 20/00* (2022.01)
*G06T 7/194* (2017.01)
*G06V 30/194* (2022.01)

(52) U.S. Cl.
CPC .............. *G06V 20/00* (2022.01); *G06T 7/194* (2017.01); *G06V 30/194* (2022.01); *G06T 2207/20081* (2013.01)

(58) Field of Classification Search
None
See application file for complete search history.

(56) References Cited

U.S. PATENT DOCUMENTS

| 2014/0379588 | A1* | 12/2014 | Gates ................. G06Q 10/30 705/308 |
| 2020/0175883 | A1* | 6/2020 | Stelmar Netto ... G01N 29/4445 |
| 2020/0222949 | A1* | 7/2020 | Murad ................ B07C 7/005 |
| 2020/0342240 | A1* | 10/2020 | Szoke-Sieswerda ... B65F 3/041 |
| 2020/0372498 | A1* | 11/2020 | Chen ................... H04L 9/3239 |
| 2021/0035146 | A1* | 2/2021 | Odom ................ G06Q 30/0226 |

* cited by examiner

*Primary Examiner* — Nay A Maung
*Assistant Examiner* — Nicolas James Boyajian
(74) *Attorney, Agent, or Firm* — Thrasher Associates

(57) ABSTRACT

Embodiment herein discloses methods and devices for waste management by using an artificial intelligence based waste object categorizing engine. The method includes acquiring at least one image and detecting at least one waste object from the at least one acquired image. Additionally, the method determines that the at least one detected waste object matches with a pre-stored waste object and identifies a type of the detected waste object using the pre-stored waste object. Furthermore, the method includes displaying the type of the detected waste object based on the identification.

6 Claims, 11 Drawing Sheets

METHODS AND ELECTRONIC DEVICES FOR AUTOMATED WASTE MANAGEMENT

FIELD OF THE INVENTION

The present invention relates to waste management systems, and more particularly, to devices and methods that automate waste management.

BACKGROUND

Interpretation Considerations

This section describes technical field in detail and discusses problems encountered in the technical field. Therefore, statements in the section are not to be construed as prior art.

Discussion of History of the Problem

Common existing waste disposal systems include unclassified garbage collected from various places which are then manually separated at a waste disposal facility. The manual separation of solid waste brings health hazards for waste sorters as well as is less efficient, time consuming and not completely feasible due to the large quantity of waste disposed by modern households, business, and industry. To make a waste disposal system efficient, an automatic waste disposal system is needed for sorting, processing, crushing, compacting, and rinsing the waste using an identifier (e.g., barcode identifier, or the like).

In order to make this process efficient, various methods and systems have been introduced in the prior arts. U.S. patent Ser. No. 10/943,897 (Kline et al) discloses a waste material recovery and conversion center/power plant, to replace traditional trash transfer stations and landfills.

U.S. Pat. No. 7,269,516 (Brunner et al) discloses mining experiment information to identify pattern(s) from data measurement databases collected from observation.

U.S. patent Ser. No. 15/963,755 (Kumar et al) discloses a material sorting system that sorts materials utilizing a vision and/or x-ray system that implements a machine learning system in order to identify or classify each of the materials, which are then sorted into separate groups based on such an identification or classification.

U.S. patent Ser. No. 16/177,137 (Horowitz et al) discloses systems for optical material characterization of waste materials using machine learning. Further, the U.S. patent Ser. No. 16/247,449 (Parr et al) discloses a system control for a material recovery (or recycling) facility.

However, in the prior arts, dating back over many decades, there is no automated method and system for the waste management that is accurate. Therefore, there is a long-felt need for an inventive approach that can overcome the limitations associated with conventional waste management techniques. In order to solve these problems, the present invention provides an automated device, system and method for waste management that is fast and accurately reliable.

SUMMARY

The present invention discloses an artificial intelligence based method for an automatic waste management.

In a first aspect of the invention, a method for a waste management is disclosed. The method includes acquiring at least one image. Additionally, the method includes detecting at least one waste object from the at least one acquired image. Further, the method includes determining that the at least one detected waste object matches with a pre-stored waste object, identifying a type of the detected waste object using the pre-stored waste object, and displaying the type of the detected waste object based on the identification.

In one embodiment, the method further includes notifying the type of the detected waste object to a user.

In an alternative preferred embodiment, the pre-stored waste object is generated by acquiring a waste object dataset comprising a waste object with various categories, acquiring a portion of an image corresponding to the waste object from the acquired waste object dataset, training the portion of the image corresponding to the waste object using a machine learning model, and generating the pre-stored waste object based on the trained portion of the image corresponding to the waste object.

In an embodiment, detecting the at least one waste object from the at least one acquired image includes identifying the at least one waste object from the at least one acquired image, extracting the at least one identified waste object from the at least one acquired image by processing a foreground portion of the at least one acquired image and a background portion of the at least one acquired image, determining at least one feature parameter based on the extraction, analyzing a pixel or pixels corresponding to the at least one identified waste object based on the determined feature parameter, and detecting the at least one waste object from the at least one acquired image based on the analyzed pixel(s).

In yet another embodiment, identifying the type of the detected waste object using the pre-stored waste object includes determining whether multiple types of the detected waste object are detected, and performing one of: in response to determining that multiple types of the waste object is not detected, identifying the type of the detected waste object using at least one feature parameter, and in response to determining that multiple types of the waste object is detected, determining at least one feature parameter based on the at least one identified waste object, analyzing a pixel or pixels corresponding to the at least one identified waste object based on the determined feature parameter, and detecting the at least one waste object from the at least one acquired image based on the analyzed pixel(s).

In alternative embodiments, the feature parameter comprises a shape of the waste object, a color of the waste object, an intensity of the waste object.

In a second aspect of the present invention, an electronic device for an automatic waste management is disclosed. The electronic device includes a processor coupled to a memory, and an artificial intelligence based waste object categorizing engine coupled to the processor. The artificial intelligence based waste object categorizing engine is configured to acquire at least one image, detect at least one waste object from the at least one acquired image, and determine that the at least one detected waste object matches with a pre-stored waste object. The artificial intelligence based waste object categorizing engine is also configured to identify a type of the detected waste object using the pre-stored waste object, and may display the type of the detected waste object based on the identification.

BRIEF DESCRIPTION OF DRAWINGS

The preferred embodiment of the invention will hereinafter be described in conjunction with the appended drawings provided to illustrate and not to limit the scope of the invention, wherein like designation denote like element, prior art is explicitly identified as "Prior Art", and in which.

DESCRIPTION OF AN EXEMPLARY PREFERRED EMBODIMENT

Interpretation Considerations

Figure 1:
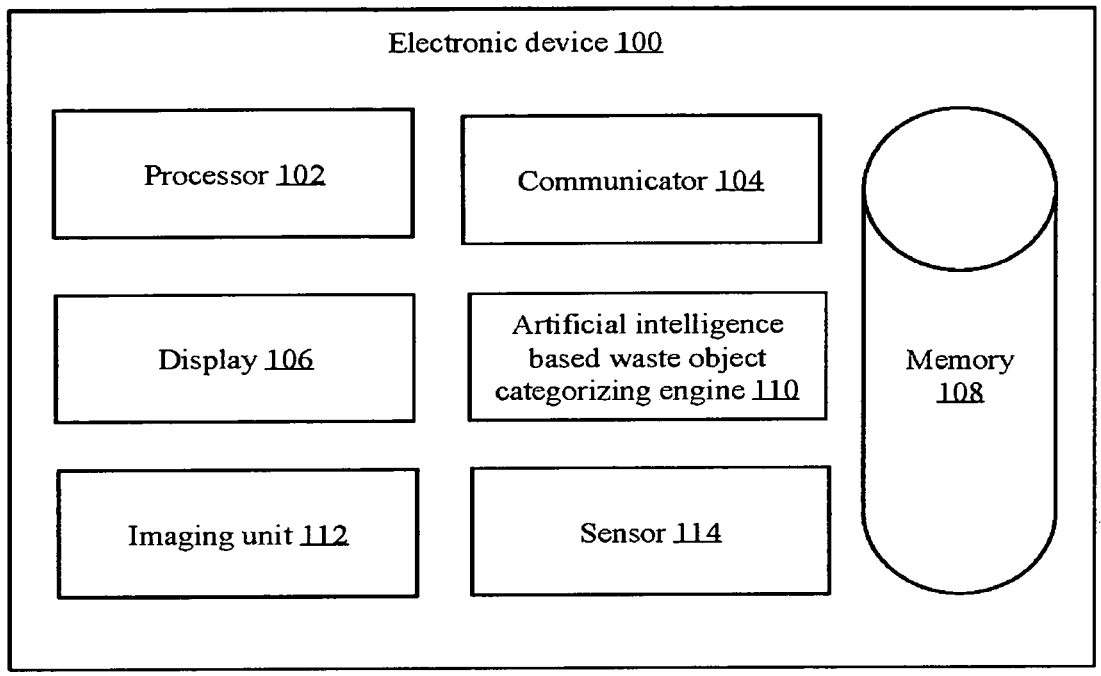
FIG. 1 is a block diagram of an electronic device for waste management according to the teachings of the invention.

While reading this section (Description of An Exemplary Preferred Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, sheet drying may be performed through dry or wet heat application, or by using microwaves. Therefore, the use of the word "paper drying" invokes "dry heating" or "wet heating" and all other modes of this word and similar words such as "pressure heating".

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted in the block diagram to not obscure the invention. In the following discussion, acts with similar names are performed in similar manners, unless otherwise stated.

The foregoing discussions and definitions are provided for clarification purposes and are not limiting. Words and phrases are to be accorded their ordinary, plain meaning, unless indicated otherwise.

In the following detailed description of embodiments of the invention, numerous specific details are set forth in order to provide a thorough understanding of the embodiment of invention. However, it will be obvious to a person skilled in the art that the embodiments of invention may be practiced with or without these specific details. In other instances, well known methods, procedures and components have not been described in detail so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

In a preferred embodiment, the present invention provides an artificial intelligence based waste object categorizing engine that is in selected embodiments custom designed (and may thus employ a using a custom designed and captured training model), and that is created from a machine learning method called deep learning method. The machine learning enables the artificial intelligence based waste object categorizing engine to automatically learn and improve from experience without being explicitly programmed.

The deep learning method uses networks capable of learning in an unsupervised fashion from data that is unstructured or unlabeled. The deep learning method employs multiple layers of neural networks that enable the artificial intelligence based waste object categorizing engine of the present invention to teach itself through inference and pattern recognition, rather than development of procedural code or explicitly coded software algorithms. The neural networks are modeled according to the neuronal structure of a mammal's cerebral cortex, wherein neurons represented as nodes and synapses represented as uniquely weighted paths between the nodes. The nodes are then organized into layers to comprise a network. The neural networks are organized in a layered fashion that includes an input layer, intermediate or hidden layers, and an output layer.

The neural networks enhance their learning capability by varying the uniquely weighted paths based on their received input. The successive layers within the neural network incorporates a learning capability by modifying their weighted coefficients based on their received input patterns. The training of the neural networks is very similar to how we teach children to recognize an object. The neural network is repetitively trained from a base data set, where results from the output layer are successively compared to the correct classification of the image.

In an alternate representation, any machine learning paradigm instead of neural networks can be used in the training and learning process.

FIG. 1 is a block diagram of an electronic device 100 for waste management. The electronic device (100) can be, for example, but not limited to a smart sort artificial intelligence (AI) bin system, a smart bin wastage sort device, a smart waste separator, a smart phone, a smart internet of things (IOT) device, a smart server, or the like.

In one embodiment, the electronic device includes a processor 102, a communicator 104, a display 106, a memory 108, an artificial intelligence based waste object categorizing engine 110, an imaging unit 112, and a sensor 114. Although physical connections are not illustrated, the processor 102 is communicatively-coupled with the communicator 104, the display 106, the memory 108, the artificial intelligence based waste object categorizing engine 110, the imaging unit 112, and the sensor 114 in any manner known in the electronic arts.

The imaging unit 112 can be, for example but not limited to a standalone camera, a digital camera, a video, camera, infra-red (IR) or ultra-violet (UV) camera or the like. The sensor 114 can be, for example but not limited to a distance sensor, a fill level sensor, an electronic scale, strain gauges or the like.

In one embodiment, the imaging unit 112 acquires at least one image and shares the at least one acquired image to the artificial intelligence based waste object categorizing engine 110. In one example, the camera captures real-time digital images (e.g., RGB images or the like) or near real-time 2-dimensional digital images or continuous stream of digital images and adds a geo-tag to the acquired images, where the images may include multiple subjects. The multiple subjects include a user's hand on a waste object, the waste object on a tray, a background portion along with the acquired images. In another example, the digital camera captures a waste image and the sensor detects useful feature information from the waste image, then the digital camera and the sensor transfers the information to the artificial intelligence based waste object categorizing engine 110.

After receiving the at least one acquired image, the artificial intelligence based waste object categorizing engine 110 detects at least one waste object from the at least one acquired image. In an example, the artificial intelligence based waste object categorizing engine 110 processes continuous streams of the digital images or the acquired images to produce properly cropped images containing only the waste objects and minimal background for contextual understanding and increasing probability certainty related to the waste object.

In an alternative embodiment, the artificial intelligence based waste object categorizing engine 110 is configured to identify the at least one waste object from the at least one acquired image. Additionally, the artificial intelligence based waste object categorizing engine 110 is configured to extract the at least one identified waste object from the at least one acquired image by processing a foreground portion of the at least one acquired image and a background portion of the at least one acquired image. Based on the extraction, the artificial intelligence based waste object categorizing engine 110 is configured to determine at least one feature parameter. The feature parameter can be, for example but not limited to a shape of the waste object, a color of the waste object, an intensity of the waste object, an IR-detectable or UV-detectable image, a texture information of the of the waste object or the like.

In an example, the artificial intelligence based waste object categorizing engine 110 utilizes connected-component information corresponding to the acquired images to divide the image into pixels and detect foreground that are not part of a primary item of interest in the foreground image. This results in a bounding box around a main waste object to remove portions of other objects in the raw acquired image and processes the raw acquired images using AI algorithms or vision computer algorithms. Further, the artificial intelligence based waste object categorizing engine 110 creates the feature values representing how each pixel responded to the AI algorithms or the vision computer algorithms.

Based on the determined feature parameter, the artificial intelligence based waste object categorizing engine 110 is configured to analyze a pixel or pixels corresponding to the at least one identified waste object. Based on the analyzed pixel(s), the artificial intelligence based waste object categorizing engine 110 is configured to detect the at least one waste object from the at least one acquired image.

After detecting the at least one waste object from the at least one acquired image, the artificial intelligence based waste object categorizing engine 110 is configured to determine that the at least one detected waste object matches with a pre-stored waste object.

In an embodiment, the pre-stored waste object is generated by acquiring a waste object dataset comprising a set of waste object along with various categories, acquiring a portion of the image corresponding to the each set of waste object from the acquired waste object dataset, training the portion of the image corresponding to the each set of the waste object using a machine learning model 306, and generating the pre-stored waste object based on the trained portion of the image corresponding to the waste object. The machine learning model 306 is explained in conjunction with the FIG. 3.

By using the pre-stored waste object, the artificial intelligence based waste object categorizing engine 110 is configured to identify a type of the detected waste object. In an example, the artificial intelligence based waste object categorizing engine 110 is configured to identify the type of the detected waste object using a machine learning classifier or a filter. The type can be, for example, but not limited to a recyclable type, a trash type, a compost type, or the like. In an example, the images correspond to a glass, a cardboard, a metal, a paper, a Styrofoam, a food then, recycling type waste will be a glass, straws, aluminum and the trash type waste will be Styrofoam, coffee cups.

In an alternative embodiment, the artificial intelligence based waste object categorizing engine 110 is configured to determine whether multiple types of the detected waste object are detected. Alternatively, if multiple types of the waste object are not detected, the artificial intelligence based waste object categorizing engine 110 is configured to identify the type of the detected waste object using the at least one feature parameter.

In another embodiment, if multiple types of the waste object are detected, the artificial intelligence based waste object categorizing engine 110 determines the at least one feature parameter based on the at least one identified waste object, analyzes the pixel or pixels corresponding to the at least one identified waste object based on the determined feature parameter, and detects the at least one waste object from the at least one acquired image based on the analyzed pixel(s).

Based on identifying the type of the detected waste object, the artificial intelligence based waste object categorizing engine 110 is configured to display the type of the detected waste object on the display 106. The display 106 can be, for example, but not limited to, an information display, a LED display, an LCD display or the like.

Further, the artificial intelligence based waste object categorizing engine 110 is configured to notify the type of the detected waste object to a user using the communicator 104. The communicator 104 can be, for example, but not limited to, a Bluetooth communicator, a Wireless fidelity (Wi-Fi) communicator, a light fidelity (Li-Fi) communicator or the like. In an example, the notification is provided in the form of a visual alert through an audio using a speaker, LED's and on-screen messaging. In another example, the notification is provided in the form push messages to the user.

Further, the memory 108 comprises stored instructions, the instructions causing the artificial intelligence based waste object categorizing engine 110 to perform functions on the at least one image when executed by the at least one processor 102. The imaging unit 112 is connected with the processor 102 via the communicator 104 including a wired communication means or a wireless communication means such as, but not limited to, Bluetooth, near field communication, Wi-Fi, universal serial bus, or the like.

In an embodiment, if the images are colored images, then the artificial intelligence based waste object categorizing engine 110 utilizes to add extra information in order to assist in higher accuracy pixel classification. The accuracy of the artificial intelligence based waste object categorizing engine 110 is directly proportional to the quality of the images. The image resolution provides most effective classification of individual pixels and overall objects yet to be tested in various lighting conditions, backgrounds and variable scenarios. The camera image capture must be continuous (i.e., from point of detection to point of disposal). The images must be well lit, not distorted and as unobtrusive as possible.

Further, the artificial intelligence based waste object categorizing engine 110 uses multiple techniques including clustering, and a KNN classifier, but other classifiers can be used within the scope of the invention.

Figure 2:
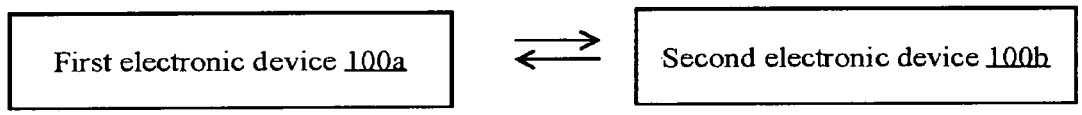
FIG. 2 is a block diagram of a system for waste management.

The communicator 104 is configured to communicate with internal units and with external devices via one or more networks or a second electronic device (illustrated in the FIG. 2). The memory 108 may include one or more computer-readable storage media. Accordingly, the memory 108 may include non-volatile storage elements. Examples of such non-volatile storage elements may include magnetic hard disc, optical discs, floppy discs, flash memories, or forms of electrically programmable memories (EPROM) or electrically erasable and programmable (EEPROM) memories. In addition, the memory 108 may, in some examples, be considered a non-transitory storage medium. The term "non-transitory" may indicate that the storage medium is not embodied in a carrier wave or a propagated signal. However, the term "non-transitory" should not be interpreted that the memory 108 is non-movable.

Although FIG. 1 shows various units of the electronic device 100, it is understood by those of skill in the art upon reading this disclosure that other embodiments are not limited thereon. In other embodiments, the electronic device 100 may include less or more number of various units. Further, the labels or names of the various units are used only for illustration purpose and does not limit the scope of the invention. One or more units can be combined together to perform same or substantially similar function to manage the waste.

FIG. 2 is a block diagram of a system 200 for waste management. In one embodiment, the system 200 includes a first electronic device 100a and a second electronic device 100b. The first electronic device 100a transfers the at least one image to the second electronic device 100b in real-time, in near real-time, or in a recorded format. After receiving the at least one image from the first electronic device 100a, the second electronic device 100b performs the various operations to manage the waste. The operations and functions of the second electronic device 100b are previously explained in conjunction with the FIG. 1.

FIG. 2 shows the limited overview of the system 200 but, it is readily understood to those of skill in the art upon reading this disclosure that other embodiments are not so limited. Further, the system 200 can include any number of hardware or software components communicating with each other.

Figure 3:
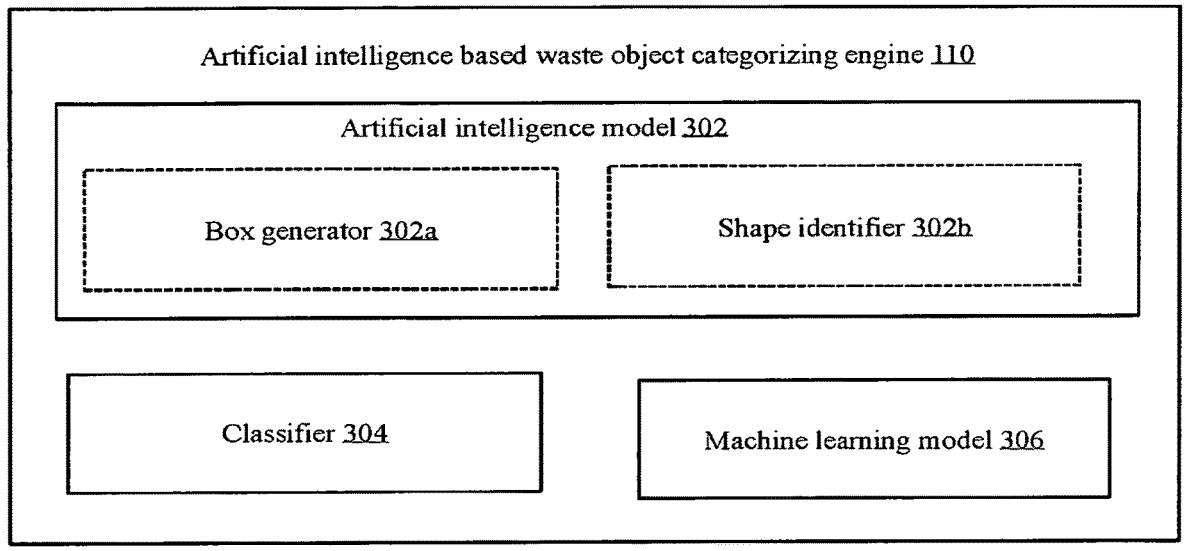
FIG. 3 is a block diagram of an artificial intelligence based waste object categorizing engine included in the electronic device for waste management.

FIG. 3 is a block diagram of the artificial intelligence based waste object categorizing engine 110 included in the electronic device 100 for waste management. In one embodiment, the artificial intelligence based waste object categorizing engine 110 includes an artificial intelligence model 302, a classifier 304, and a machine learning model 306. Additionally, the artificial intelligence model 302 includes a box generator 302a and a shape identifier 302b. The classifier 304 can be, for example, but not limited to a k-nearest neighbors (KNN) classifier. The machine learning model 306 can be, for example but not limited to, a supervised learning and deep learning based learning model and multilayer hybrid deep-learning based learning model.

In an embodiment, the machine learning model 306 is configured to classify the waste objects in the raw images into high level groups such as metals, glass, cardboard, paper, Styrofoam, food, plastic, etc. to direct, reward, educate and align context with content. The artificial intelligence model 302 requires training examples prior to classification, allows the machine learning model 306 to associate specific combinations of object vectors with specific classes types. The result of this stage of the artificial intelligence model 302 during runtime operation is an overall classification for the object based on the configured categories. The waste object will be deposited based on the classification. Additionally, objects not falling under current classifications will be fed into the machine learning routine, described in FIG. 7 and FIG. 8, to further train the system and expand on possible classification brackets.

The box generator 302a outputs a set of bounding boxes related to the waste information, where each bounding boxes defines the location, size and category label of the waste object. The box generator 302a generates a clear boundary for a physical characteristics corresponding to the waste object. In an example, an icon size and an icon share are visually varied based on an intensity of the physical characteristics corresponding to the waste object. The shape generator 302b outputs predicted shapes and intensity of the physical characteristics corresponding to the waste object. The box generator 302a and the shape generator 302b can operate individually either in series or parallel or as a single entity. The classifier 304 classifies the pixel value features into classes using an unsupervised learning model.

In an embodiment, a framework performs a machine learning procedure to train the classifier 306 using a training image pixel dataset. The classifier 304 is applied to image pixel(s) to identify one or more different pixels, which may then be corrected. The artificial intelligence model 302 and the machine learning model 306 receive one or more training image datasets from a reference imaging system. Alternatively, the artificial intelligence model 302 and the machine learning model 306 may use or incorporate corrob architecture, training and implementation to "teach", modify and implement identification of waste materials.

In another embodiment, the artificial intelligence model 302 uses a convolutional neural network (CNN)-based technique to extract the features corresponding to the image and a multilayer perceptron technique to consolidate image features to classify wastes as recyclable, trash, compost or the others. The multilayer perceptron technique is trained and validated against the manually labelled waste objects. Further, the artificial intelligence model 302 acts as a response center to classify the waste object by consolidating information collected from the imaging unit 112.

Figure 4:
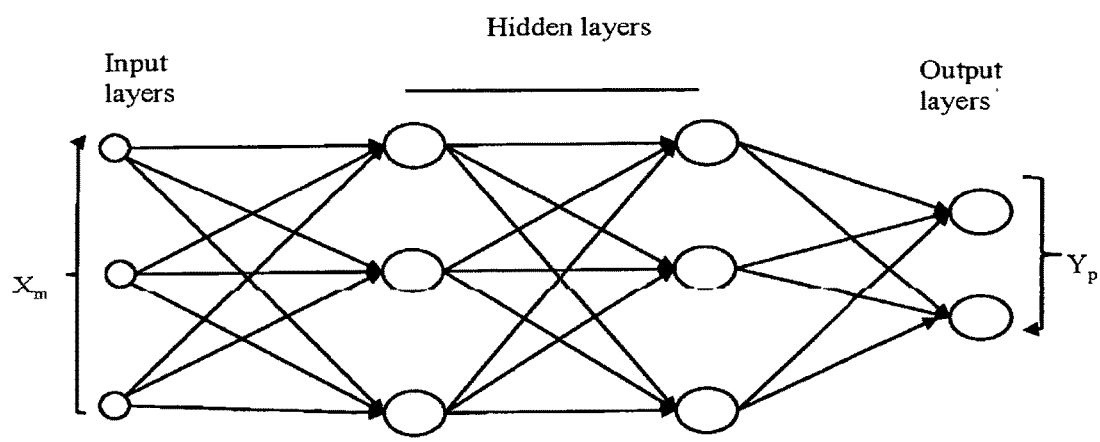
FIG. 4 is a schematic diagram illustrating various layers in the artificial intelligence based waste object categorizing engine.

In another embodiment, the machine learning model 306 can be a layer based neural network (e.g., 4 layer deep learning network, 5 layer neural network or the like) and train it for a predictive analysis. For example, the 4 layer based neural network has 32, 16, 10 and 4 nodes at each level for achieving deep learning for the waste object prediction. The predict function will pass feature vector set to the neural network and produce the output as seen in FIG. 4. As shown in the FIG. 4, the layers between a first layer (i.e., input layer) and a last layer (i.e., output layer) are called as hidden layers. All layers are used to process and predict the waste object. In another example, 4 layer neural network is used for waste object prediction in which last layer (i.e., output layer will have 6 nodes for predicting the waste object). In general, the neural network has $1^{st}$ layer including 32 nodes, $2^{nd}$ layer corresponding to 16 nodes, last layer including 5 nodes or 6 nodes for predicting the waste object.

In another embodiment, the machine learning model 306 is created by a tenser flow library. Initially, the machine learning model 306 builds a data set of m-set of waste objects which is created by getting and tagging information across Internet for the waste classification. Further, the machine learning model 306 extracts the features of the waste objects in the dataset. From the tenser flow library model, the machine learning model 306 will co-relate the waste object belongs to which category. In an example, the waste predicted through the machine learning model 306 are recyclable, trash, compost.

In an embodiment, the accuracy and the speed of the machine learning model 306 varies based on amount of raw dataset the machine learning model 306 is trained on. In another embodiment, the accuracy and the speed of the machine learning model 306 varies based on a frame rate, overall CPU power, a GPU power or the like.

Figure 5:
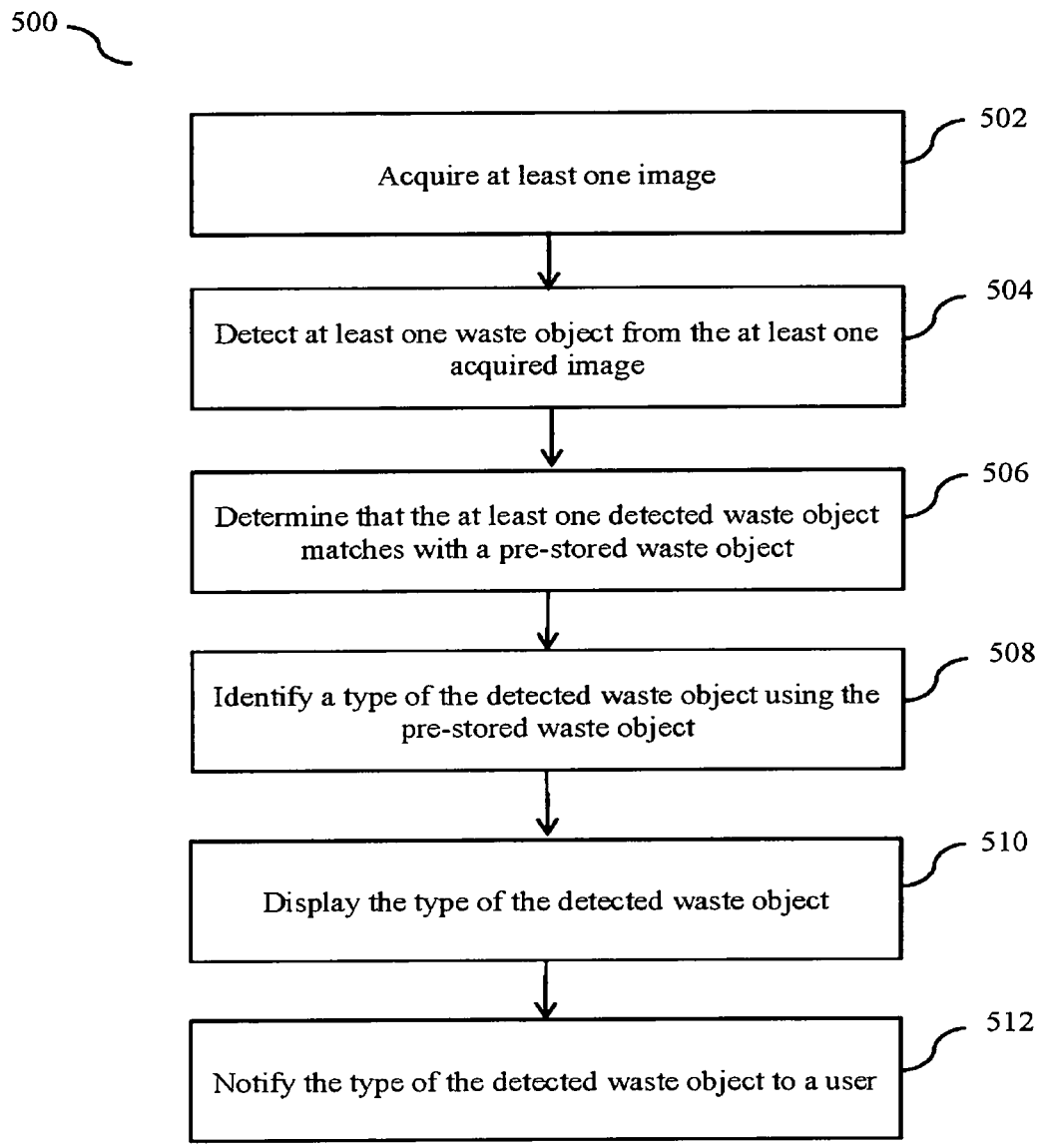
FIG. 5 is a flow chart illustrating a method for waste management.

FIG. 5 is a flow chart 500 illustrating a method for waste management, in accordance with an embodiment of the present invention. The operations (502-512) are performed by the artificial intelligence based waste object categorizing engine 110.

In act 502 the method comprises acquiring the at least one image. At act 504, the method includes detecting the at least one waste object from the at least one acquired image. Then, in act 506, the method includes determining that the at least one detected waste object matches with the pre-stored waste object. Next, in act 508 the method includes identifying the type of the detected waste object using the pre-stored waste object. At act 510, the method includes displaying the type of the detected waste object based on the identification. And, in act 512 the method includes notifying the type of the detected waste object to the user.

The proposed method can be used to direct the user behavior for waste sorting using the AI based computer vision techniques. The proposed method can be used to evaluate and sort waste into desired categories, i.e., recyclables, trash and compost. The proposed method can be implemented in a trash disposal at many location (e.g., office spaces, apartments, recreational area, stadiums, home, public places, park, street cleaning, or the like). The proposed method can be used by a user (e.g., technicians, agriculture user, food court servant, pedestrian, or the like).

The proposed method can be used to capture the visual information of the user carrying the waste object to analyze and sort waste into the right stream and provide a visual alert (through LED's and on-screen messaging) or audio message to the user, so as to automatically sort waste disposed of by the user.

Figure 6:
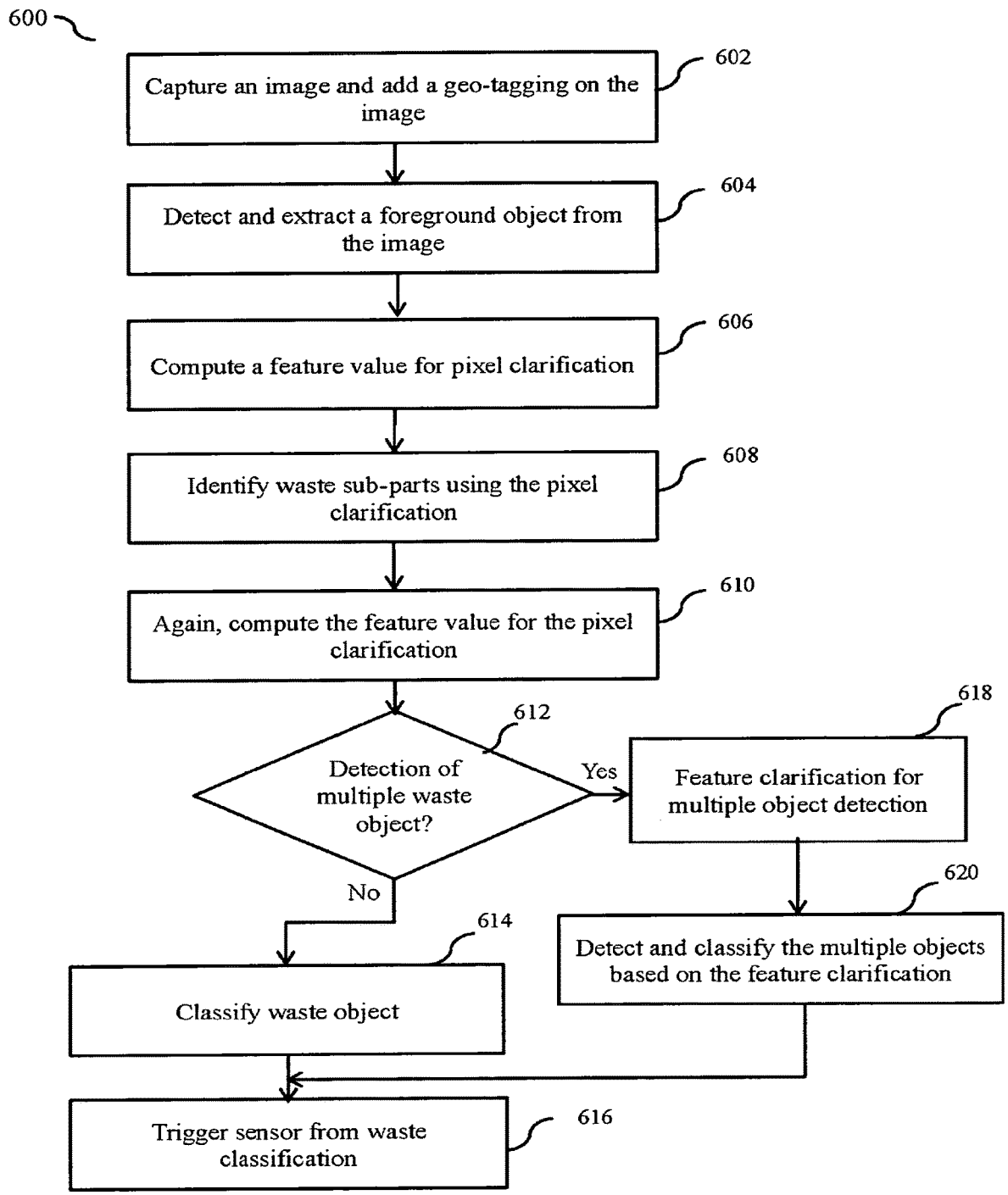
FIG. 6 is an example flow chart illustrating various operations for waste management.

FIG. 6 is an example flow chart 600 illustrating various operations for waste management.

Starting in act 602 the method includes capturing the image and adding the geo-tagging on the image. As an example, the camera captures the image and adds the geo-tagging on the image.

In an act 604 the method includes detecting and extracting the foreground object from the acquired image. As an example, the artificial intelligence based waste object categorizing engine 110 detects and extracts the main objects and sub-images from the acquired raw image and separates the background portion from the acquired raw image.

At act 606, the method includes computing the feature value corresponding to the feature parameter for the pixel clarification associated with the acquired raw image. In an example, the artificial intelligence based waste object categorizing engine 110 computes the feature value corresponding to the feature parameter for the pixel clarification associated with the acquired raw image using the shape of the waste object and color of the waste object.

Then, in act 608 the method includes identifying the waste sub-parts using the pixel clarification. As an example, the artificial intelligence based waste object categorizing engine 110 identifies the waste sub-parts using the pixel clarification.

Next, in act 610, the method again computes the feature value corresponding to the feature parameter for the pixel clarification. As an example, the artificial intelligence based waste object categorizing engine 110 again computes the feature value corresponding to the feature parameter for the pixel clarification.

At query 612, the method can determine whether multiple waste objects are detected. If multiple waste objects are not detected then, in an act 614, the method includes classifying the waste object. As an example, the artificial intelligence based waste object categorizing engine 110 may classify the waste object.

Then, at act 616 the method includes triggering the sensor 114 from the waste classification. As an example, the processor 102 triggers the sensor 114 for the waste classification.

Alternatively from the query 612, if multiple waste objects are detected then, at an act 618 the method includes performing the feature clarification corresponding to the features values for multiple object detection. In an example, the artificial intelligence based waste object categorizing engine 110 performs the feature clarification corresponding to the features values for multiple object detection.

After act 618, the method proceeds to act 620 which includes detecting and classifying the multiple objects based on the feature clarification. As an example, the artificial intelligence based waste object categorizing engine 110 detects and classifies the multiple objects based on the feature clarification.

Figure 7:
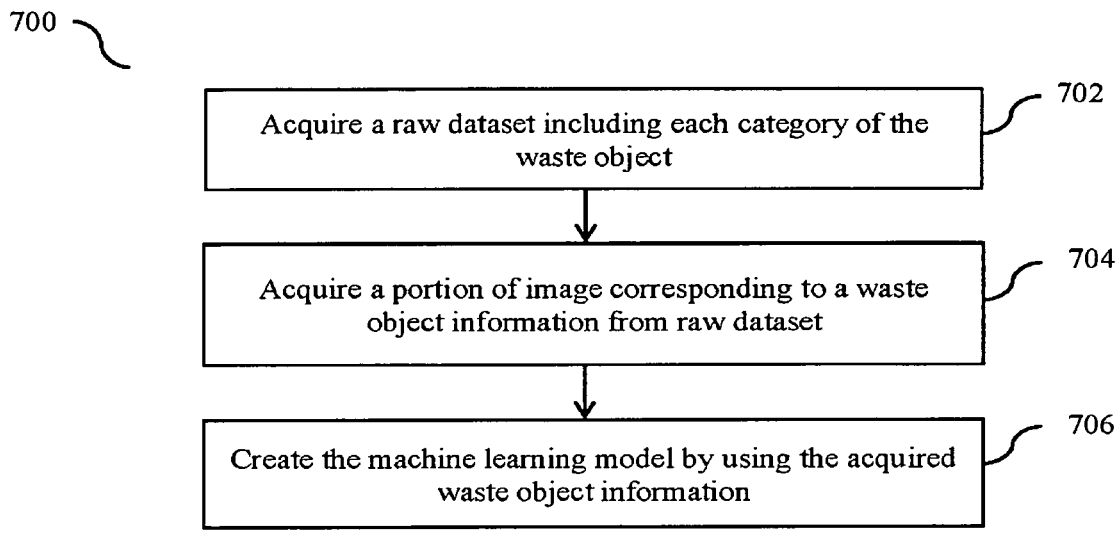
FIG. 7 is a flow chart illustrating various operations for creating a machine learning model in conjunction with the FIG. 5.

FIG. 7 is a flow chart illustrating various operations for creating the machine learning model 306 in conjunction with FIG. 5. The operations (702-706) are performed by the artificial intelligence model 302.

The method 700 starts in act 702 which includes acquiring a raw dataset including the set of waste object along with various categories. Next, in an act 704, the method includes acquiring the portion of the image corresponding to the waste object from the raw dataset. Then, in act 706 the method includes creating the machine learning model by using the acquired waste object information. The machine learning model is trained based on a frame rate, overall CPU power, a GPU power, or the like.

Figure 8:
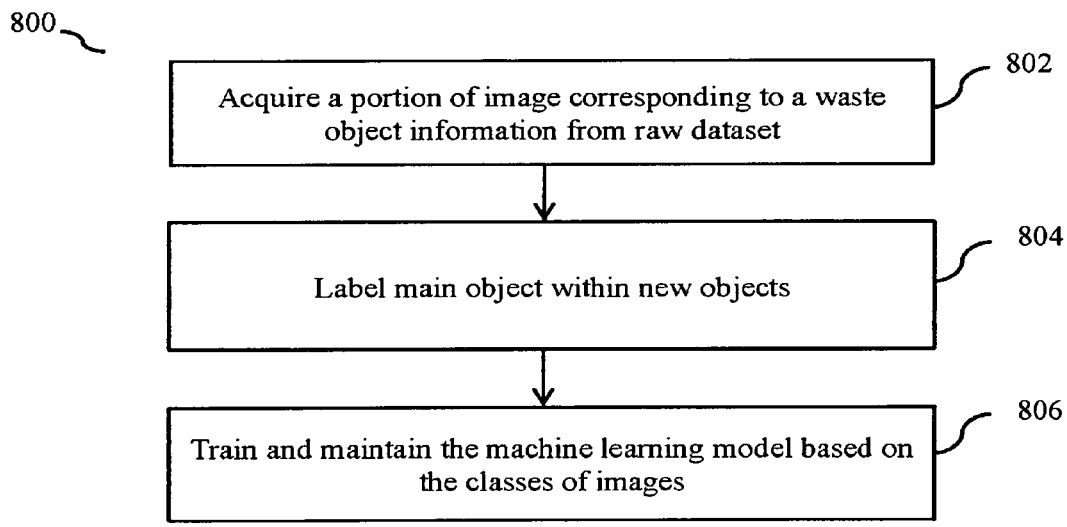
FIG. 8 is a flow chart illustrating various operations for training and maintaining the machine learning model in conjunction with the FIG. 5.

FIG. 8 is a flow chart illustrating various operations for training and maintaining the machine learning model 306 in connection with the FIG. 5, in accordance with an embodiment of the present invention. The operations (802-806) are performed by the artificial intelligence model 302.

First, in an act 802 the method includes acquiring the portion of the image corresponding to the waste object from the raw dataset. Next in an act 804 the method includes labelling the main object within the waste objects. Then, in act 806 the method includes training and maintaining the machine learning model based on the labelled main object. The labelled main object includes multiple class of the images corresponding to the waste object.

The various actions, acts, blocks, steps, or the like in the flow diagram 500-800 may be performed in the order presented, in a different order or simultaneously. Further, in some embodiments, some of the actions, acts, blocks, steps, or the like may be omitted, added, modified, skipped, or the like without departing from the scope of the invention.

Figure 9:
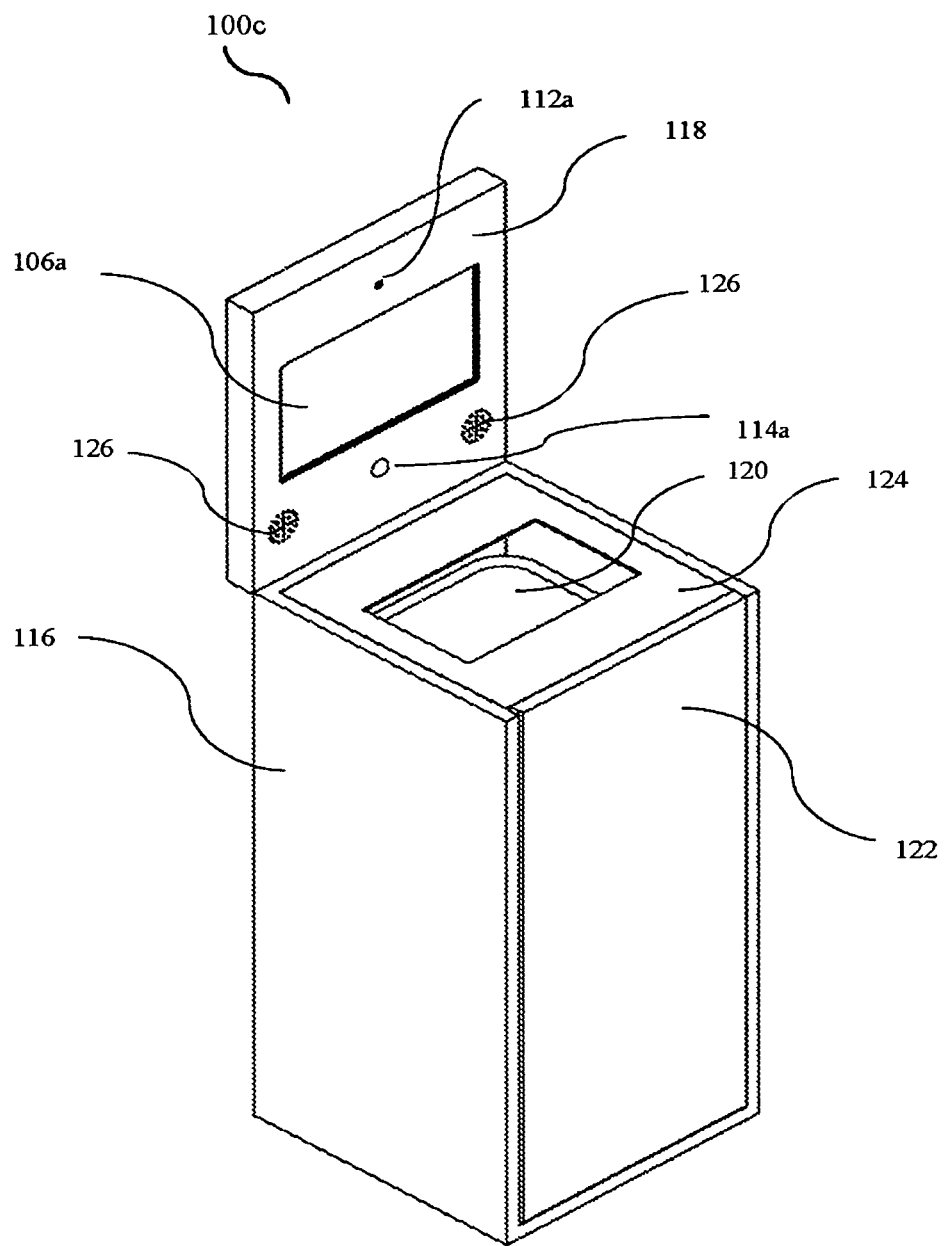
FIG. 9 is one perspective view of an inventive smart bin wastage sort device.
Figure 10:
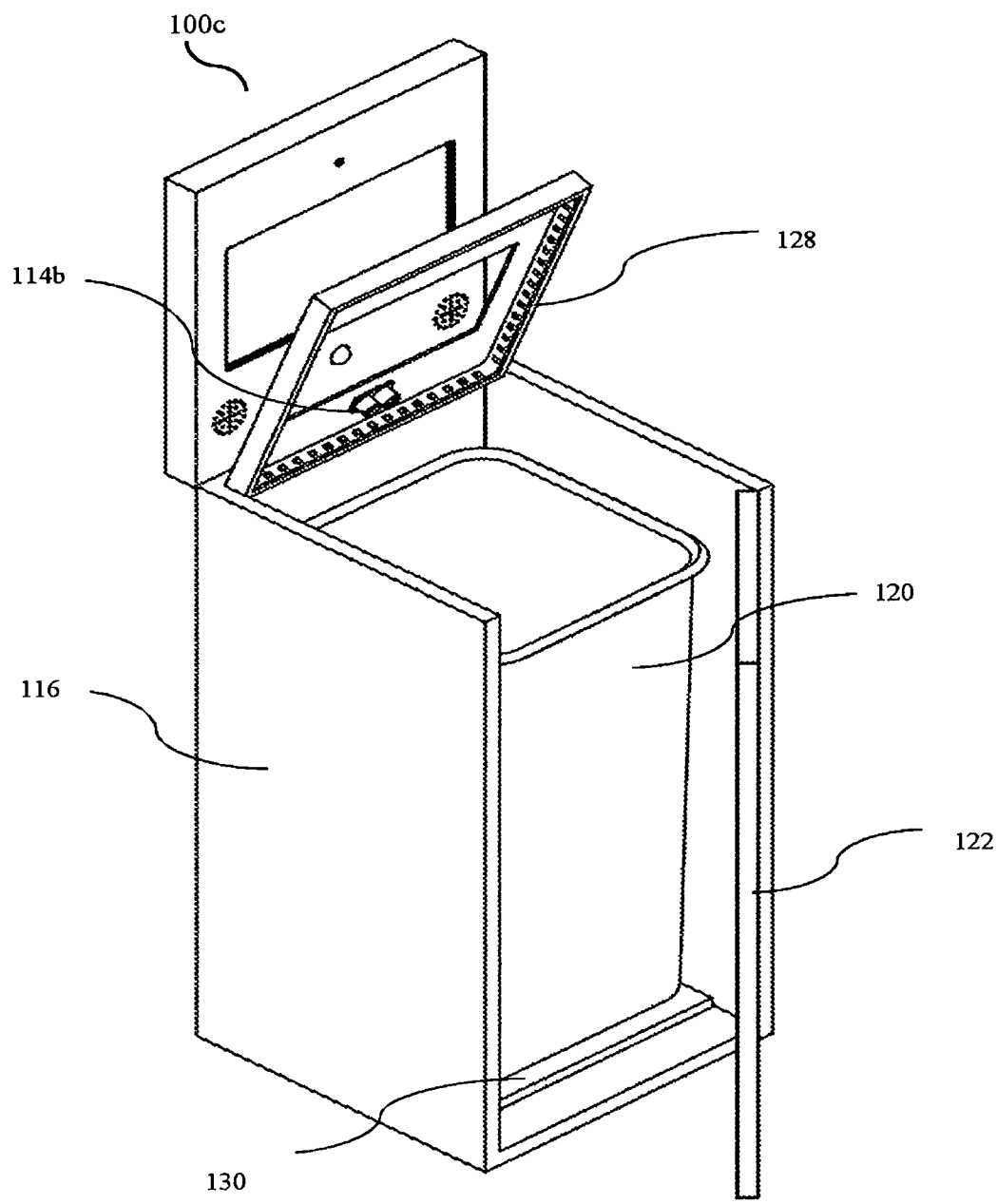
FIG. 10 is an alternative perspective view of a smart bin wastage sort device.

Simultaneous reference is made to FIG. 9 and FIG. 10, which are perspective views of a smart bin wastage sort device 100c, that incorporate the above teachings of the invention. The smart bin wastage sort device 100c is an example of an electronic device 100. Specifically, substantial operations and functions of the electronic device 100 are previously explained in conjunction with the FIG. 1 to FIG. 8.

Figure 12:
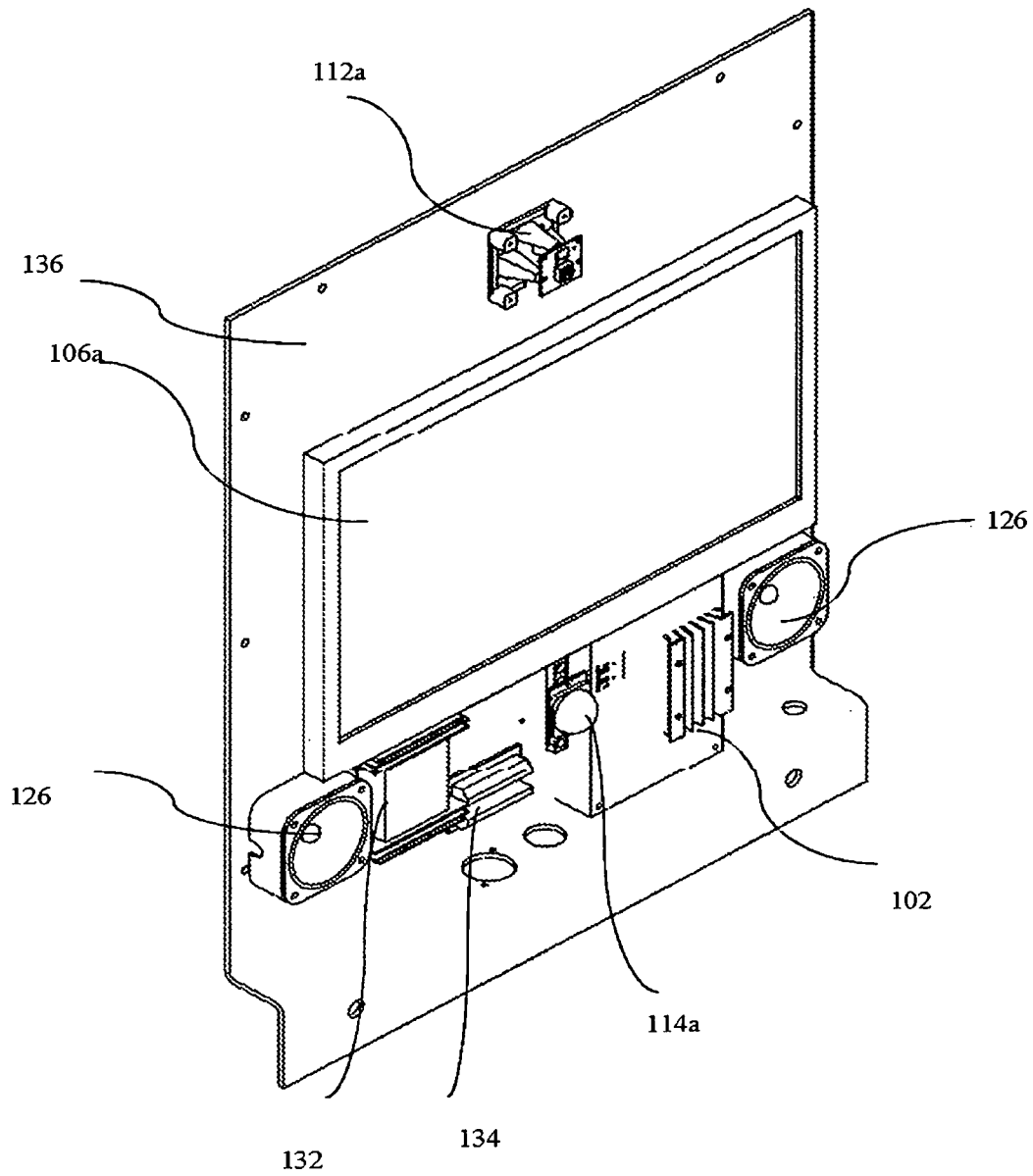
FIG. 12 is a perspective view of a smart bin back panel included in the smart bin wastage sort device.
Figure 13:
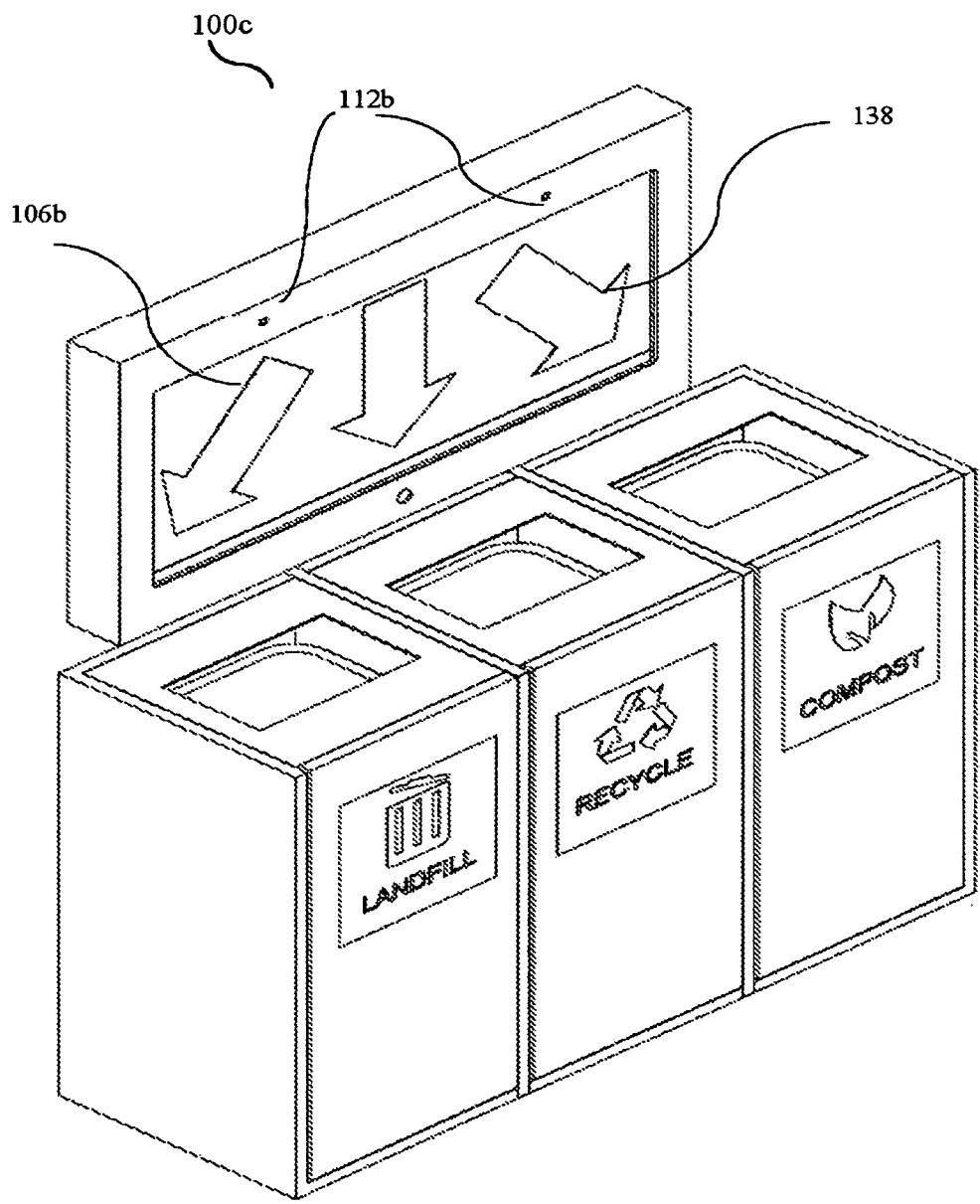
FIG. 13 is a perspective view of the smart bin wastage sort device including a visual indicator.

As shown in the FIG. 9 and FIG. 10 the smart bin wastage sort device (100c) includes a bin housing (116), a smart bin back panel (118), a collection can (120), a bin housing door (122), a bin housing lid with an opening (124), a digital camera (112a), an information display (106a), a distance sensor (114a), a speaker (126), an optical indicator (128), a fill level sensor (114b), an electronic scale (130), a strain gauges (114c) (Shown in FIG. 11), the processor (102) (Shown in FIG. 12), a power supply (132) (Shown in FIG. 12), a power distribution board (134) (Shown in FIG. 12), a mounting plate (136) (Shown in FIG. 12), a visual indicator (138) for direction (Shown in FIG. 13), a digital camera array (112b) for wider field of vision (Shown in FIG. 13), and a wide screen information display (106b) (Shown in FIG. 13). The device shown is preferably sized for home or public use, such as in an airport, sports facility (such as a stadium, for example), school or office location such as a hallway, break room, or restroom, for example.

The bin housing (116) includes the collection can (120) for collecting all types of waste material. The smart bin back panel (118) is attached with a top portion of the bin housing (116), and covers the top portion of the bin housing (116). The bin housing door (122) is provided with the bin housing (116), and the bin housing (116) includes the bin housing lid with the opening (124) for accessing and keeping the waste in the collection can (120).

The digital camera (112a) captures the image of the waste and the information display (106a) displays the type of the waste. The distance sensor (114a) measures the distance between the user and the smart bin wastage sort device (100a). The speaker (126) informs the type of the waste to the user.

As shown in more detail in FIG. 10, the optical indicator (128) indicates the type of the waste to the user and the fill level sensor (114b) measures the level of the waste stored in the collection can (120). The electronic scale (130) is provided in bottom of the collection can (120).

Figure 11:
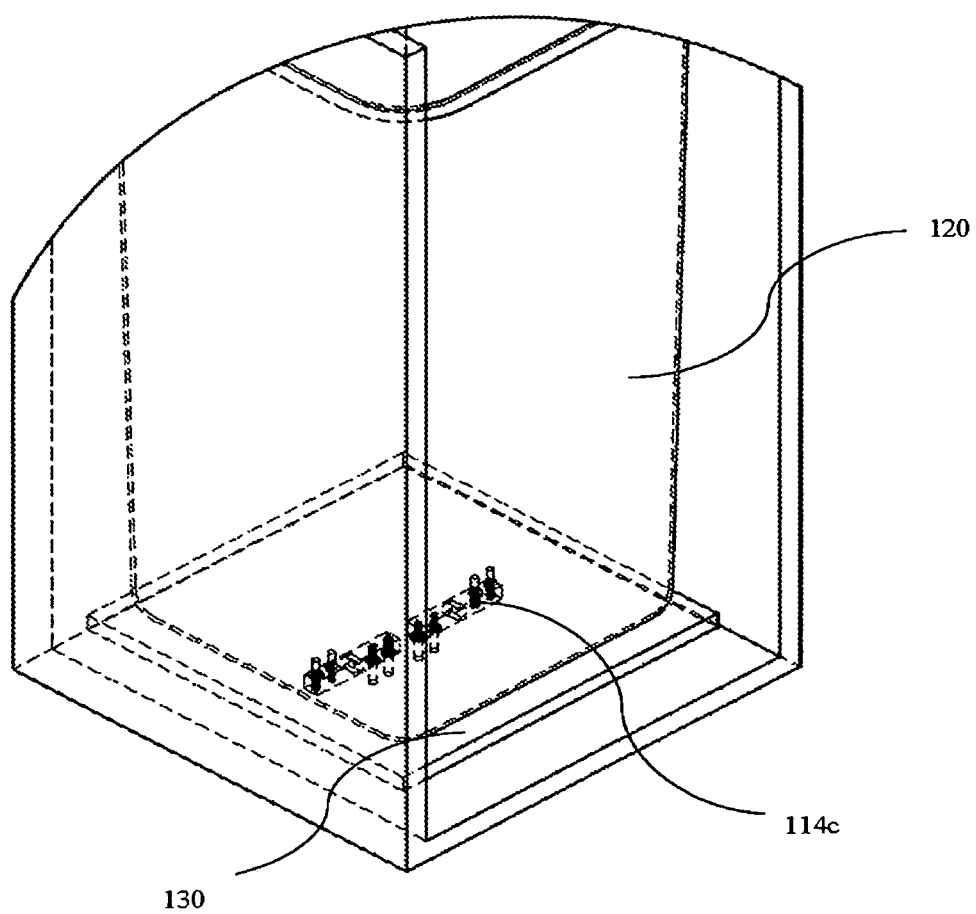
FIG. 11 is a partial sectional view of a collection can included in the smart bin wastage sort device.

FIG. 11 is a partial sectional view of the collection can 120 included in the smart bin wastage sort device 100c. As shown in the FIG. 11, the strain gauges (114c) measures the weight of the waste stored in the collection can (120). The processor (102) is coupled with various elements e.g., the collection can (120), the bin housing door (122), the bin housing lid with the opening (124), the digital camera (112a), the information display (106a), the distance sensor (114a), the speaker (126), the optical indicator (128), the fill level sensor (114b), the electronic scale (130), and the strain gauges (114c)) in the smart bin wastage sort device (100a).

FIG. 12 is a perspective view of the smart bin back panel 118 included in the smart bin wastage sort device 100c, in accordance with an embodiment of the present invention. As shown in the FIG. 12, the power supply (132) supplies the power in the smart bin wastage sort device (100a) through the power distribution board (134). The mounting plate (136) is provided in the smart bin back panel (118).

FIG. 13 is a perspective view of the smart bin wastage sort device 100c including the visual indicator 138, in accordance with an embodiment of the present invention. As shown in the FIG. 13, the visual indicator (138) indicates the direction to the user for waste disposal and the digital camera array (112b) is used for wider field of vision. The wide screen information display (106b) displays information related to the waste.

Figure 14:
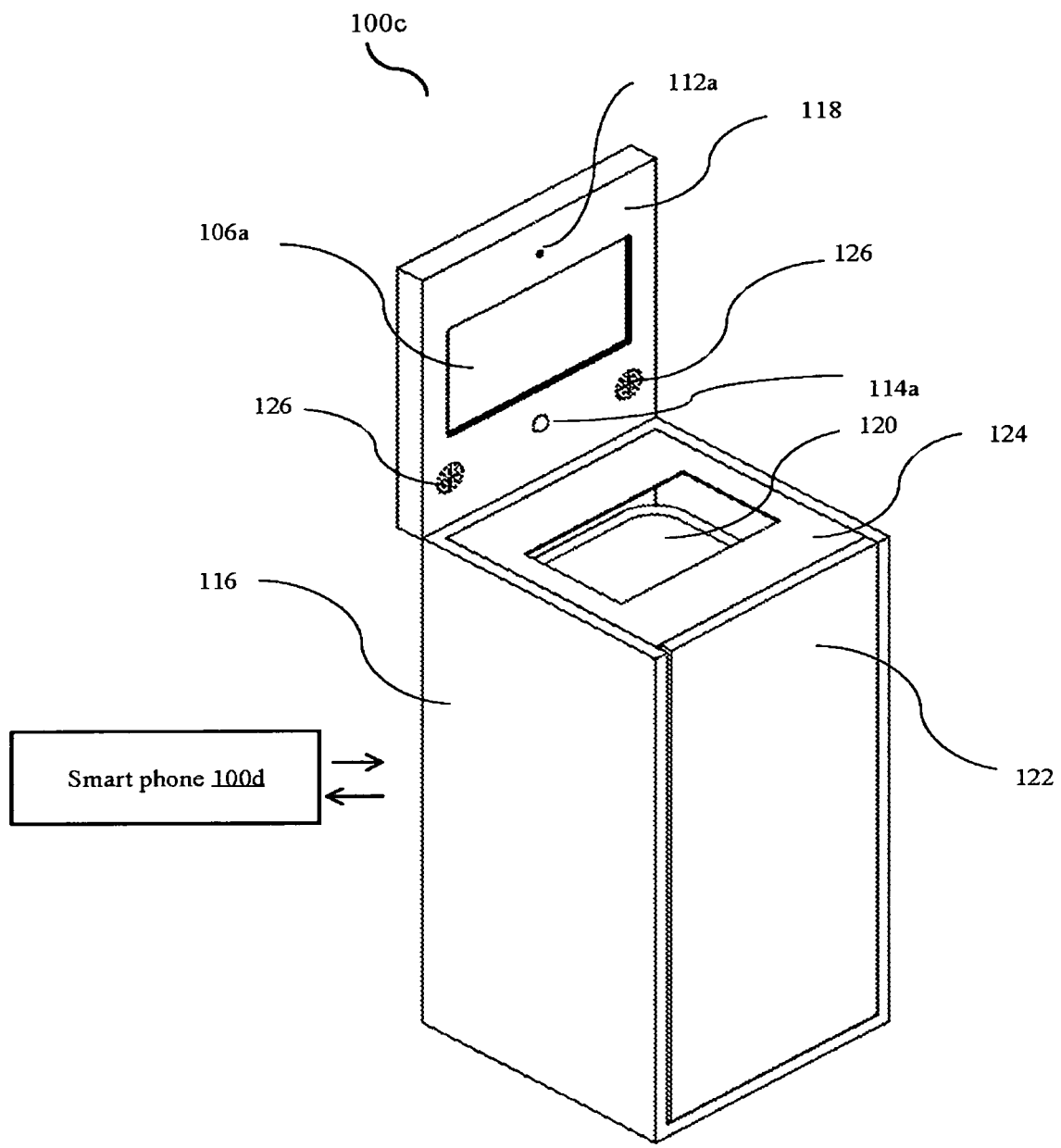
FIG. 14 is schematic view of an example system in which the smart bin wastage sort device communicates with a smart phone for waste management.

FIG. 14 is schematic view of an example system in which the smart bin wastage sort device 100c communicates with a smart phone 100d for waste management, in accordance with an embodiment of the present invention.

In one embodiment, the system includes the smart bin wastage sort device 100c and the smart phone 100d. The smart bin wastage sort device 100c transfers the at least one image to the smart phone 100d in real-time or in near real-time or in a recorded format. After receiving the at least one image from the smart bin wastage sort device 100c, the smart phone 100d performs the various operations to manage the waste. The operations and functions of the smart phone 100d are substantially explained in conjunction with the FIG. 1, FIG. 2 and FIG. 9 to FIG. 13.

Although the invention has been explained in relation to its preferred embodiment, it is to be understood that many other possible modifications and variations can be made without departing from the spirit and scope of the invention. Upon reading this disclosure, changes, modifications, and substitutions may be made by those skilled in the art to achieve the same purpose the invention. The exemplary embodiments are merely examples and are not intended to limit the scope of the invention. It is intended that the present invention cover all other embodiments that are within the scope of the descriptions and their equivalents.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or nonvolatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The networked electronic devices described herein may be in the form of a mobile communication device (e.g., a cell phone), laptop, tablet computer, interactive television, game console, media streaming device, head-wearable display, virtual or augmented reality device, networked watch, etc. The networked devices may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

We claim:

1. An electronic device for waste management, comprising:
    a memory;
    a processor coupled to the memory; and
    an artificial intelligence based waste object categorizing engine, coupled to the processor, configured to:
        acquire at least one image;
        detect at least one waste object from the at least one acquired image based on a foreground portion of the at least one acquired image, and a background portion of the at least one acquired image deriving at least one feature parameter therefrom;
        determine a feature value corresponding to the at least one feature parameter for pixel clarification associated with the at least one acquired image;
        determine that the at least one detected waste object matches with a prestored waste object;

perform at least one of:
  identify a type of the detected waste object using the pre-stored waste object; or
  provide an option to place the at least one detected waste object in a queuing library to either manually create a new classification for an unknown object, or properly align the at least one detected waste object with a correct classification in the pre-stored waste object and then add to the artificial intelligence based waste object categorizing engine to continue an artificial intelligence training process;
  display the type of the detected waste object and a message based on the identification; and
  notify a user of the type of the detected waste object;
direct the user to place the waste object in a correct waste stream;
capturing sentiment and generating a reward value that is provided via an electronic, a visual or an audible indicator, or a manual user entry; and
display an educational content based on the waste object presented.

2. The method of claim 1 wherein the sentiment is captured via a manual user entry.

3. The method of claim 1 wherein the sentiment comprises a brand sentiment.

4. A method of waste management for aligning a user context with media content and a waste object disposed by the user to inform the user at a user waste object disposal location, comprising:
  acquiring, by an artificial intelligence based waste object categorizing engine, at least one image;
  detecting, by the artificial intelligence based waste object categorizing engine, at least one waste object from the at least one acquired image based on a foreground portion of the at least one acquired image, and a background portion of the at least one acquired image deriving at least one feature parameter therefrom;
  determining, by the artificial intelligence based waste object categorizing engine, a feature value corresponding to the at least one feature parameter for pixel clarification associated with the at least one acquired image;
  determining, by the artificial intelligence based waste object categorizing engine, that the at least one detected waste object matches with a pre-stored waste object;
  performing at least one of:
    identifying, by the artificial intelligence based waste object categorizing engine, a type of the detected waste object using the pre-stored waste object; or
    when a detected Waste object is not identified, placing the at least one detected waste object in a queuing library to:
      manually create a new classification for an unknown object, or
      properly align the at least one detected waste object with a correct classification in the pre-stored waste object, and then
      adding the new classification to the artificial intelligence based waste object categorizing engine to continue a training process;
  displaying, by the artificial intelligence based waste object categorizing engine, the type of the detected waste object based on the identification; and
  notifying, by the artificial intelligence based waste object categorizing engine, the type of the detected waste object to a user;
  directing the user to place the waste object in a correct waste receptacle, and capturing a sentiment of the user;
  providing a reward value generated by an indicator or an electronic device to the user; and
  displaying an educational content based on the waste object presented.

5. A method of waste management for aligning a user context with media content and a waste object disposed by the user to inform the user at a user waste object disposal location, comprising:
  acquiring, by an artificial intelligence based waste object categorizing engine, at least one image;
  detecting, by the artificial intelligence based waste object categorizing engine, at least one waste object from the at least one acquired image based on a foreground portion of the at least one acquired image, and a background portion of the at least one acquired image deriving at least one feature parameter therefrom;
  determining, by the artificial intelligence based waste object categorizing engine, a feature value corresponding to the at least one feature parameter for pixel clarification associated with the at least one acquired image;
  determining, by the artificial intelligence based waste object categorizing engine, that the at least one detected waste object matches with a pre-stored waste object;
  performing at least one of:
    identifying, by the artificial intelligence based waste object categorizing engine, a type of the detected waste object using the pre-stored waste object; or
    when a detected waste object is not identified, placing the at least one detected waste object in a queuing library to:
      manually create a new classification for an unknown object, or
      properly align the at least one detected waste object with a correct classification in the pre-stored waste object, and then
      adding the new classification to the artificial intelligence based waste object categorizing engine to continue a training process;
  displaying, by the artificial intelligence based waste object categorizing engine, the type of the detected waste object based on the identification; and
  notifying, by the artificial intelligence based waste object categorizing engine, the type of the detected waste object to a user;
  classifying the waste object into a category based on configured categories;
  depositing the waste object based on the classifying act;
  applying machine learning to train the method and add classification categories for classifying objects not falling under the then-existing classifications; and
  providing an indicator of the category to the user to educate the consumer about the proper category and treatment of the waste object.

6. A method of waste management for aligning a user context with media content and a waste object disposed by the user to inform the user at a user waste object disposal location, comprising:
  acquiring, by an artificial intelligence based waste object categorizing engine, at least one image;
  detecting, by the artificial intelligence based waste object categorizing engine, at least one waste object from the at least one acquired image based on a foreground portion of the at least one acquired image, and a background portion of the at least one acquired image deriving at least one feature parameter therefrom;

determining, by the artificial intelligence based waste object categorizing engine, a feature value corresponding to the at least one feature parameter for pixel clarification associated with the at least one acquired image;

determining, by the artificial intelligence based waste object categorizing engine, that the at least one detected waste object matches with a pre-stored waste object;

performing at least one of:
   identifying, by the artificial intelligence based waste object categorizing engine, a type of the detected waste object using the pre-stored waste object; or
   when a detected waste object is not identified, placing the at least one detected waste object in a queuing library to:
      manually create a new classification for an unknown object, or
      properly align the at least one detected waste object with a correct classification in the pre-stored waste object, and then
      adding the new classification to the artificial intelligence based waste object categorizing engine to continue a training process;

displaying, by the artificial intelligence based waste object categorizing engine, the type of the detected waste object based on the identification; and notifying, by the artificial intelligence based waste object categorizing engine, the type of the detected waste object to a user;

using a machine learning procedure to train the classifier by using a training image pixel dataset, by:
   applying the classifier to at least one image pixel to identify at least one different pixel, which may then be corrected; and
   receiving at least one training image datasets from a reference imaging system at the artificial intelligence model and the machine learning model.

* * * * *